United States Patent
Yang et al.

(10) Patent No.: US 11,906,832 B1
(45) Date of Patent: Feb. 20, 2024

(54) DUAL SIDE VIEW WAVEGUIDE LIQUID CRYSTAL DISPLAYS

(71) Applicant: Toyota Motor Engineering & Manufacturing North America, Inc., Plano, TX (US)

(72) Inventors: Deng-Ke Yang, Kent, OH (US); Yunho Shin, Kent, OH (US); Guangkui Qin, Beijing (CN); Sean P. Rodrigues, Ann Arbor, MI (US)

(73) Assignees: Toyota Motor Engineering & Manufacturing North America, Inc., Plano, TX (US); MIRISE Technology Corporation, Beijing (CN); Kent State University, Kent, OH (US)

( * ) Notice: Subject to any disclaimer, the term of this patent is extended or adjusted under 35 U.S.C. 154(b) by 0 days.

(21) Appl. No.: 17/875,779

(22) Filed: Jul. 28, 2022

(51) Int. Cl.
| | |
|---|---|
| *G02F 1/1333* | (2006.01) |
| *G02F 1/1343* | (2006.01) |
| *G02F 1/1334* | (2006.01) |
| *F21V 8/00* | (2006.01) |
| *G02F 1/1335* | (2006.01) |

(52) U.S. Cl.
CPC ..... *G02F 1/133342* (2021.01); *G02B 6/0063* (2013.01); *G02F 1/1334* (2013.01); *G02F 1/133512* (2013.01); *G02F 1/134309* (2013.01)

(58) Field of Classification Search
CPC ......... G02F 1/134309; G02F 1/133512; G02F 1/1334; G02F 1/133342; G02B 6/0063
See application file for complete search history.

(56) References Cited

U.S. PATENT DOCUMENTS

| | | | |
|---|---|---|---|
| 10,121,992 B2 | 11/2018 | Hu | |
| 10,403,612 B2 | 9/2019 | Lo et al. | |
| 10,620,477 B2 | 4/2020 | Li et al. | |
| 10,996,501 B1 | 5/2021 | Yin | |
| 2003/0063243 A1* | 4/2003 | Roosendaal | G06F 1/1637 349/113 |
| 2011/0261291 A1 | 10/2011 | Park et al. | |
| 2016/0274412 A1* | 9/2016 | Gu | G02F 1/1334 |
| 2019/0155104 A1* | 5/2019 | Li | G02F 1/13362 |
| 2021/0405405 A1 | 12/2021 | Chiang et al. | |

\* cited by examiner

*Primary Examiner* — Mariam Qureshi
(74) *Attorney, Agent, or Firm* — Christopher G. Darrow; Darrow Mustafa PC

(57) ABSTRACT

A dual side view display includes a waveguide with an inside transparent layer and an outside transparent layer spaced apart from and parallel to the inside transparent layer, and a plurality of inside view liquid crystal (LC) pixels and a plurality of outside view LC pixels disposed within the waveguide. The plurality of outside view LC pixels are disposed within the waveguide parallel to and in-plane with the plurality of inside view LC pixels. The plurality of inside LC pixels includes a plurality of outside blocking layers configured to block light scattered in the plurality of inside view LC pixels from propagating through the outside transparent layer. Also, the plurality of outside view LC pixels includes a plurality of inside blocking layers configured to block light scattered in the plurality of outside view LC pixels from propagating through the inside transparent layer.

20 Claims, 6 Drawing Sheets

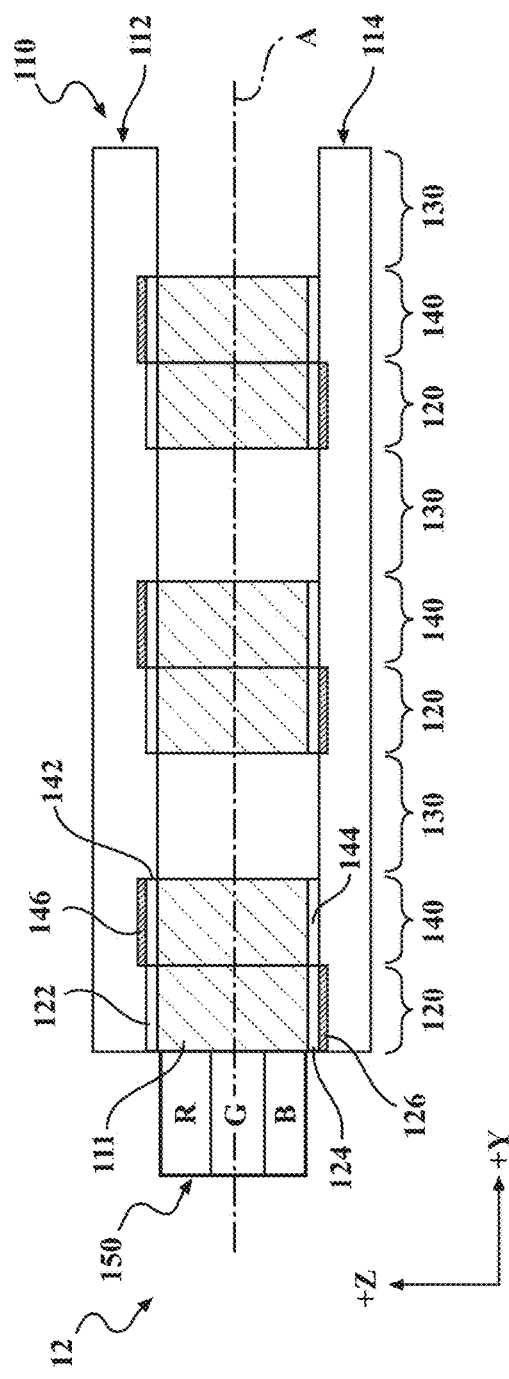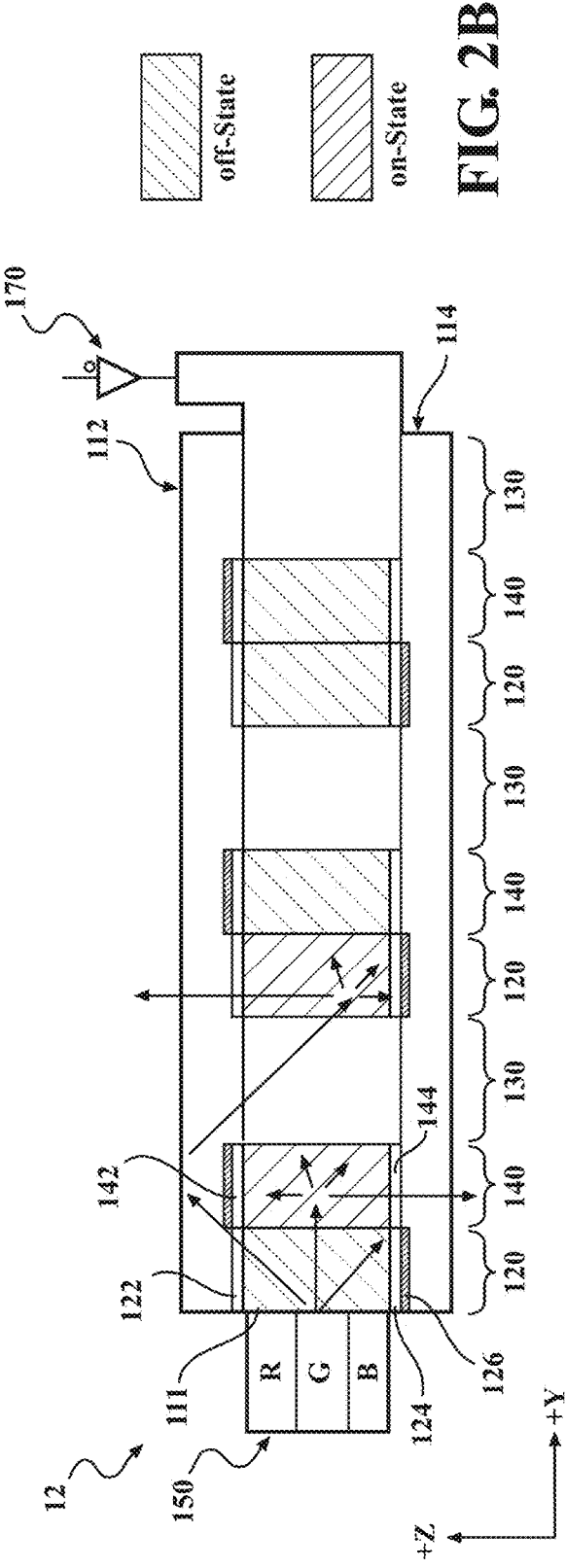

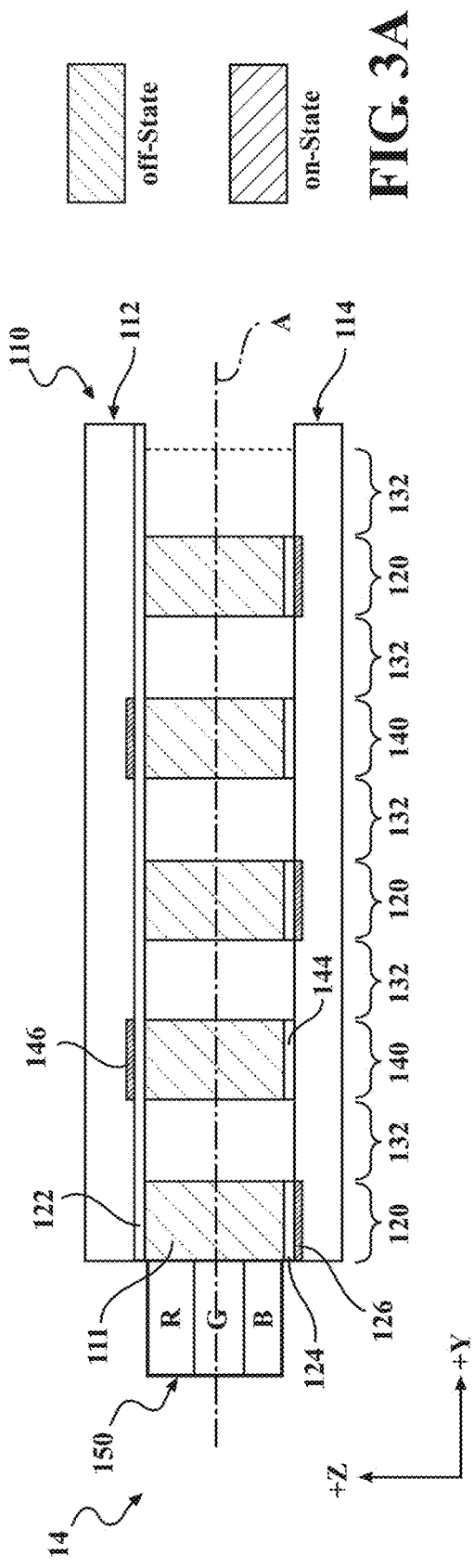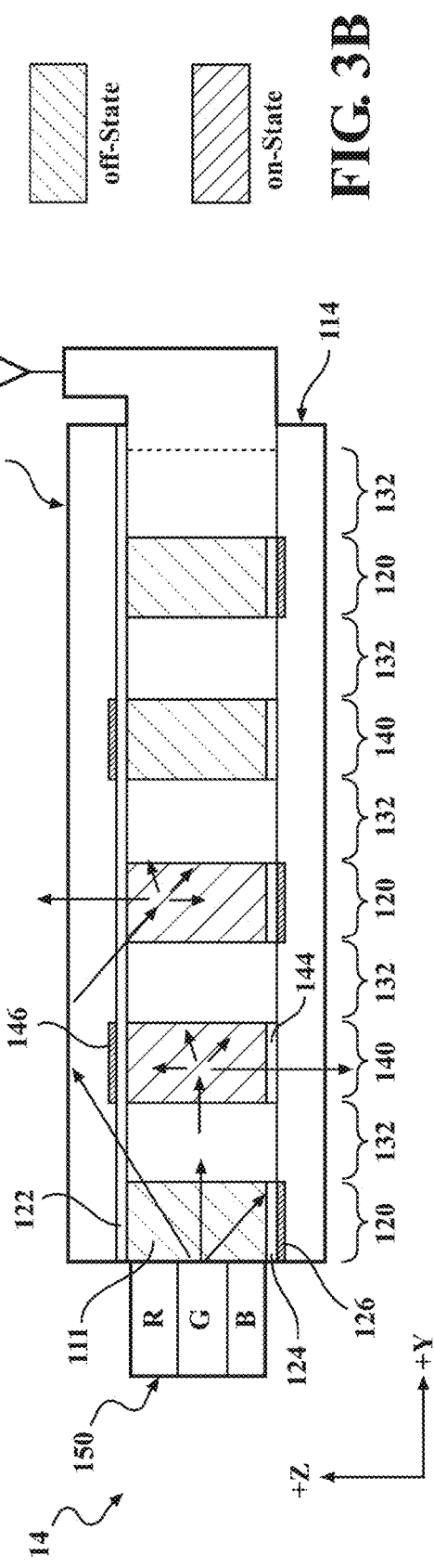

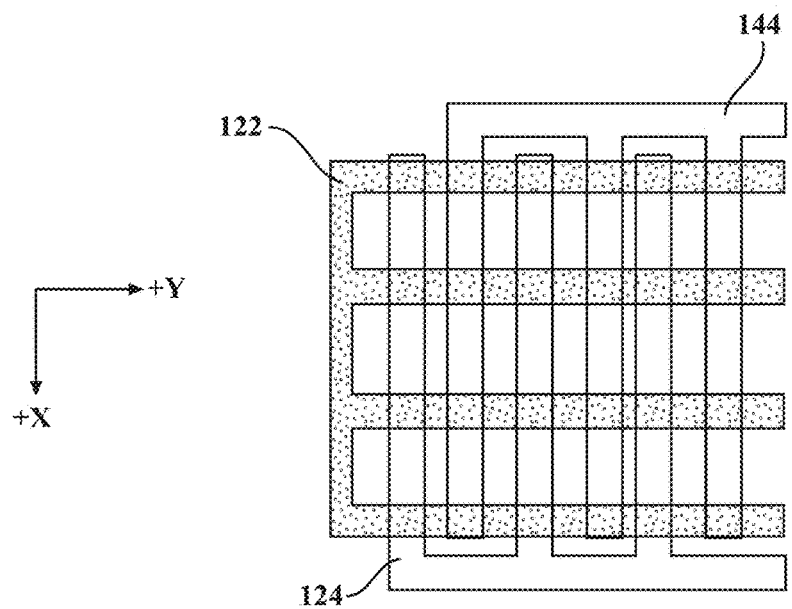
FIG. 3C
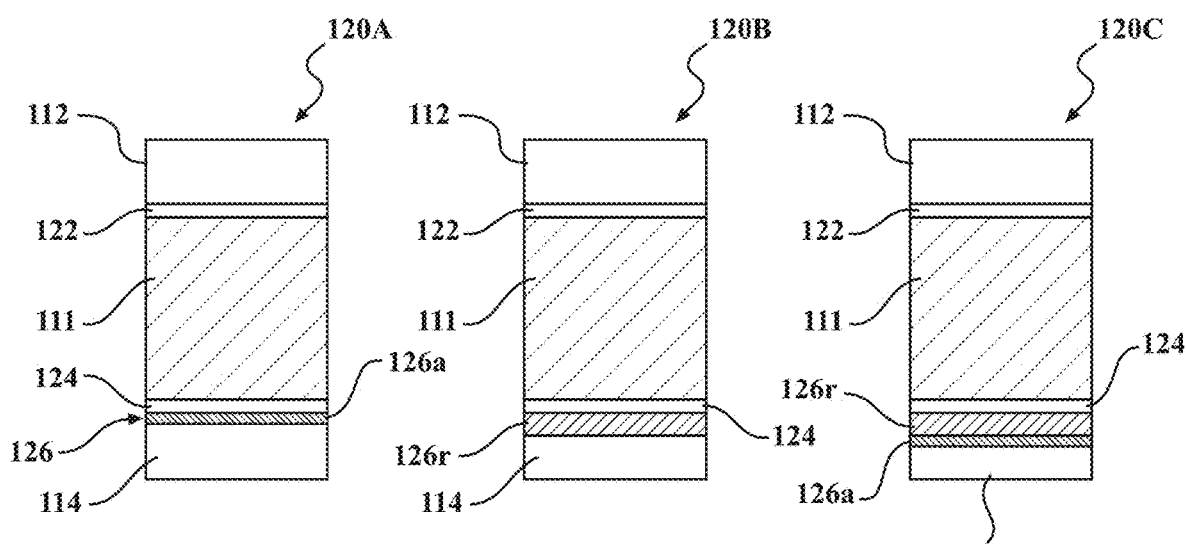
FIG. 4A  FIG. 4B  FIG. 4C

DUAL SIDE VIEW WAVEGUIDE LIQUID CRYSTAL DISPLAYS

TECHNICAL FIELD

The present disclosure relates generally to waveguide liquid crystal displays, and particularly to dual side view waveguide liquid crystal displays.

BACKGROUND

Development of electronic displays is an ongoing field of research. For example, recently developed (i.e., within the last 15 years) transparent displays provide an image for an individual to see on one side of the display while being transparent such that the individual can also see through the display. For example, some transparent displays display an image that is transparent while other transparent displays display an image that is opaque (or bright) with the remainder of the transparent display being transparent. However, such displays can exhibit undesirable optical effects such as light bleeding, i.e., an image shown on one side of the display is shown on the opposite side of the display. In fact, most single sided transparent displays bleed some amount of light to the unintended or reverse side of the display.

The present disclosure addresses issues related to light bleeding and displayed views to unintended viewers in transparent displays, and other issues related to transparent displays.

SUMMARY

This section provides a general summary of the disclosure and is not a comprehensive disclosure of its full scope or all of its features.

In one form of the present disclosure, a dual side view display includes a waveguide with an inside transparent layer and an outside transparent layer spaced apart from and parallel to the inside transparent layer, and a plurality of inside view liquid crystal (LC) pixels and a plurality of outside view LC pixels disposed within the waveguide. The plurality of outside view LC pixels are parallel to and in-plane with the plurality of inside view LC pixels. The plurality of inside view LC pixels include a plurality of outside blocking layers configured to block light scattered in the plurality of inside view LC pixels from propagating through the outside transparent layer and the plurality of outside view LC pixels include a plurality of inside blocking layers configured to block light scattered in the plurality of outside view LC pixels from propagating through the inside transparent layer.

In another form of the present disclosure, a dual side view display includes a waveguide with an inside transparent layer and an outside transparent layer spaced apart from and parallel to the inside transparent layer, a light source attached to an edge of the waveguide and configured to propagate light within the waveguide, and a plurality of inside view LC pixels and a plurality of outside view LC pixels disposed within the waveguide. The plurality of outside view LC pixels are parallel to and in-plane with the plurality of inside view LC pixels. The plurality of inside view LC pixels include a plurality of outside blocking layers configured to block light scattered in the plurality of inside view LC pixels from propagating through the outside transparent layer and the plurality of outside view LC pixels include a plurality of inside blocking layers configured to block light scattered in the plurality of outside view LC pixels from propagating through the inside transparent layer.

In still another form of the present disclosure, a dual side view display includes a waveguide with an inside transparent layer and an outside transparent layer spaced apart from and parallel to the inside transparent layer, a light source attached to an edge of the waveguide and configured to propagate light within the waveguide, and a plurality of inside view LC pixels and a plurality of outside view LC pixels disposed within the waveguide. The plurality of outside view LC pixels are parallel to and in-plane with the plurality of inside view LC pixels. The plurality of inside view LC pixels include an inside electrode proximal to the inside transparent layer, an outside electrode proximal to the outside transparent layer, a LC material sandwiched between the inside electrode and the outside electrode, and a plurality of outside blocking layers configured to block light scattered in the plurality of inside view LC pixels from propagating through the outside transparent layer. Also, the plurality of outside view LC pixels include an inside electrode proximal to the inside transparent layer, an outside electrode proximal to the outside transparent layer, a LC material sandwiched between the inside electrode and the outside electrode, and a plurality of inside blocking layers configured to block light scattered in the plurality of outside view LC pixels from propagating through the inside transparent layer.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein:

FIG. 2A shows another form of a dual side view transparent waveguide LC display according to the teachings of the present disclosure;

FIG. 2B shows the dual side view transparent waveguide LC display in FIG. 2A with light scattered in an inside view LC pixel and an outside view LC pixel according to the teachings of the present disclosure;

FIG. 3A shows still another form a dual side view transparent waveguide LC display according to the teachings of the present disclosure;

FIG. 3B shows the dual side view transparent waveguide LC display in FIG. 3A with light scattered in an inside view LC pixel and an outside view LC pixel according to the teachings of the present disclosure;

FIG. 3C is a top view of an arrangement of electrodes for the dual view side transparent LC display in FIGS. 3A and 3B;

FIG. 4A shows one form of an inside view LC pixel according to the teachings of the present disclosure;

FIG. 4B shows another form of an inside view LC pixel according to the teachings of the present disclosure;

FIG. 4C shows yet another form of an inside view LC pixel according to the teachings of the present disclosure;

DETAILED DESCRIPTION

The present disclosure provides a dual side view waveguide LC display (also referred to herein simply as "dual side view LC display") that displays a first image on an inside of the dual side view LC display and a second image different than the first image on an outside of the dual side view LC display. The dual side view LC display includes inside view pixels and outside view pixels sandwiched between an inside transparent substrate and an outside transparent substrate. Also, the inside view LC pixels include outside blocking layers that block light scattered in the inside view LC pixels from propagating through the outside substrate and the outside view LC pixels include inside blocking layers that block light scattered in the outside view LC pixels from propagating through the inside substrate.

Figure 1A:
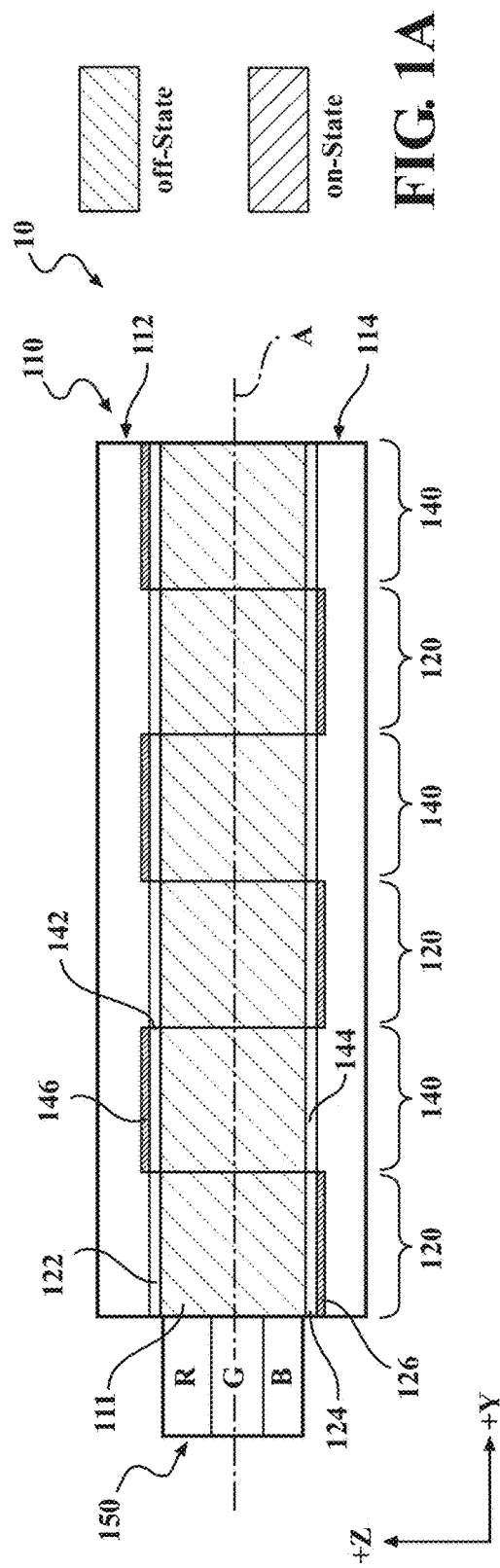
FIG. 1A shows one form a dual side view waveguide LC display according to the teachings of the present disclosure.

Referring to FIG. 1A, a dual side view LC display 10 according to one form of the present disclosure is shown. The dual side view LC display 10 includes a waveguide 110 with a plurality of inside view LC pixels 120 (also referred to herein simply as "inside view pixels 120") and a plurality of outside view LC pixels 140 (also referred to herein simply as "inside view LC pixels 120") parallel to and in-plane with the plurality of inside view LC pixels 120. As used herein, the term "inside" refers to a +z side of the waveguide 110 shown in the figures and the term "outside" refers to a −z side of the waveguide 110. For example, in some variations the "inside" is an interior side of a vehicle window and the outside is an exterior side of the vehicle window. However, it should be understood that the terms "inside" and "outside" are used herein for description or discussion purposes only. Also, the phrase "inside view LC pixel" or "inside view LC pixels" refers to a pixel or pixels that provide light to the inside of the waveguide 110 (i.e., light from an inside view LC pixel propagates in the +z direction) and the phrase "outside view LC pixel" or "outside view LC pixels" refers to a pixel or pixels that provide light to the outside of the waveguide 110 (i.e., light from an outside view LC pixel propagates in the −z direction).

The inside view LC pixels 120 and the outside view LC pixels 140 are sandwiched between an inside transparent layer 112 and an outside transparent layer 114 (also referred to herein collectively as "pair of transparent layers 112, 114) spaced apart form a parallel to the inside transparent layer 112. Also, each of the transparent layers 112, 114 has an inner surface closest to the axis of symmetry A and an outer surface farthest from the axis of symmetry A. Non-limiting examples from which the transparent layers 112, 114 are made from include glass, polymers, and ceramics.

A light source 150 configured to generate light is attached to the waveguide 110 and coupled to or into the LC display 10. That is, the dual side view LC display 10 is an edge-lit display and non-limiting examples of the light source 150 include red, green, and blue (RGB) light sources such as RGB lasers, light emitting diodes (LEDs), micro-LEDs, and quantum dots, among others.

Each of the inside view LC pixels 120 includes an inside electrode 122, an outside electrode 124, and an outside view blocking layer 126, and each of the outside view LC pixels 140 includes an inside electrode 142, an outside electrode 144, and an inside view blocking layer 146. The inside electrode 122 and the outside electrode 144 are transparent electrodes, and in some variations the outside electrode 124 and the inside electrode 142 are also transparent electrodes. Non-limiting examples from which the inside electrodes 122, 142 and/or the outside electrodes are made from include indium tin oxide (ITO), silver (Ag), copper (Cu), dielectric-metal-dielectric (e.g., $TiO_2$—Ag—$TiO_2$), among others.

The outside view blocking layer 126 blocks light in an inside view LC pixel 120 propagating in the −z direction and inside view blocking layer 146 blocks light in an outside view LC pixel 120 propagating in the +z direction. In some variations, the outside view blocking layer 126 is disposed between the outside electrode 124 and the outside transparent layer 114, and the inside blocking layer 146 is disposed between the inside electrode 122 and the inside transparent layer 112. For example, in at least one variation, the outside view blocking layer 126 is sandwiched between and/or in direct contact with the outside electrode 124 and the outside transparent layer 114, and/or the inside blocking layer 146 is sandwiched between and/or in direct contact with the inside electrode 142 and the inside transparent layer 112. In other variations, the outside view blocking layer 126 is sandwiched between and not in direct with the outside electrode 124 and/or the outside transparent layer 114, and/or the inside blocking layer 146 sandwiched between and not in direct contact with the inside electrode 142 and/or the inside transparent layer 112.

Disposed within each of the inside view LC pixels 120 and each of the outside view LC pixels 140 is a liquid crystal unit 111. It should be understood that the liquid crystal units 111 can be formed from a liquid crystal material mixed with a monomer which is polymerized, and polymerization and orientation of the liquid crystal material+monomer (also referred to herein as a "polymer stabilized liquid crystal material", "liquid crystal material" or "LC material") induces scattering sufficient for the display. Also, the inside electrodes 122, 142 and the outside electrodes 124, 144 are configured to apply a voltage to the liquid crystal material in the liquid crystal units 111. In addition, the scattering of light by a liquid crystal unit 111 sandwiched between the pair of transparent layers 112, 114 is controlled by voltage applied across the inside electrodes 122, 142 and the outside electrodes 124, 144. That is, under one voltage condition (e.g., a first voltage), a liquid crystal unit 111 is transparent and does not scatter light, while under another voltage condition (e.g., a second voltage not equal to the first voltage) a liquid crystal unit 111 is opaque and scatters light.

Figure 1B:
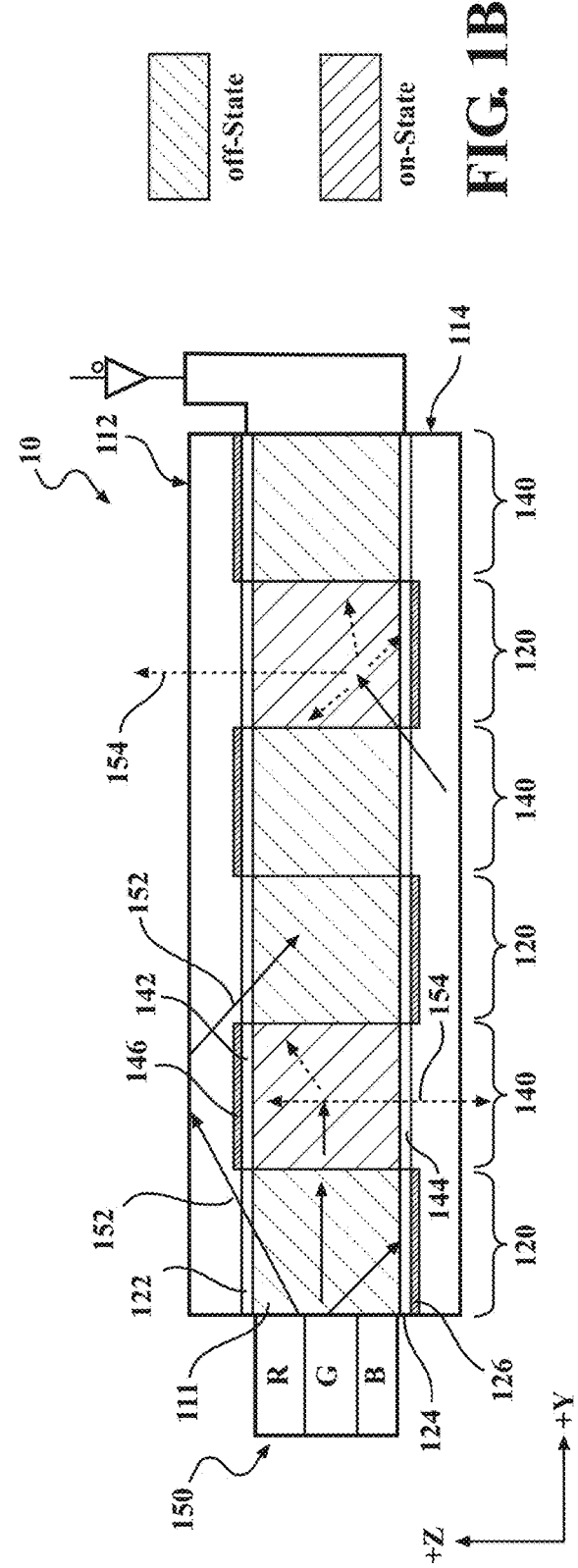
FIG. 1B shows the dual side view waveguide LC display in FIG. 1A with light scattered in an inside view LC pixel and an outside view LC pixel according to the teachings of the present disclosure.

Referring now to FIG. 1B, illustration of the dual side view LC display 10 in operation with light propagating from a selected or desired inside view LC pixel 120 and through the inside transparent layer 112 and light propagating from a selected or desired outside view LC pixel 140 and through the outside transparent layer 114 is shown. Each of the liquid crystal units 111 has two different refractive indices, n e (extraordinary) and n, (ordinary), depending on an electro-optical state of the liquid crystal material in a given liquid crystal unit 111. For example, and as illustrated in the legend of FIG. 1B, molecules of the liquid crystal material in an "off-state" allow light to transmit in the y-direction shown in the figures since there is no disruption to the flow or propagation of light, whereas in the "on-state" the polymerized molecules are disrupted when the liquid crystal alignment changes, thereby inducing scattering. Accordingly, and in response to electrical control (e.g., a voltage), the molecules of the liquid crystal units 111 are caused to orient themselves in the off-state or the on-state.

The dual side view LC display 10 includes a driver circuit 170 configured to provide an electrical control independently to each of the plurality of inside view LC pixels 120 and each of the plurality of outside view LC pixels 140. That is, the driver circuit 170 is configured to provide an electrical control independently to the inside electrode 122 and the outside electrode 124 of each of the inside view LC pixels 120 and to the inside electrode 142 and the outside electrode 144 of each of the outside view LC pixels 140. In addition, the driver circuit 170 is configured to provide an electrical control to the light source 150 such that a predefined light 152 (i.e., a predefined range of EMR wavelengths such as "green light") propagates from the light source 150 and within the waveguide 110. It should be understood that the predefined light 152 is reflected from an outer surface (+z direction) of the inside transparent layer 112, an outer surface (−z direction) of the outside transparent layer 114 and propagates through a liquid crystal unit 111 in the off-state. However, and as illustrated in FIG. 1B, when the predefined light 152 propagates into a liquid crystal unit 111 in the on-state, the predefined light 152 is scattered into scattered light 154 that propagates in a plurality of directions within the liquid crystal unit 111 in the on-state.

For example, and with reference to the liquid crystal unit 111 for the outside view LC pixel 140 closet to the light source 150 in FIG. 1B, the scattered light 154 propagating towards the inside (+z direction) is absorbed or blocked by the inside blocking layer 146 and the scattered light 154 propagating generally perpendicular to and towards the outside (−z direction) propagates through the outside transparent layer 114. Accordingly, it should be understood that scattered light 154 propagating through a plurality of outside view LC pixels 140 can provide an image to an individual viewing the dual side view LC display 10 in or from the +z direction.

In addition, and with reference to the liquid crystal unit 111 for the inside view LC pixel 120 furthest from the light source 150 in FIG. 1B, the scattered light 154 propagating towards the outside (−z direction) is absorbed or blocked by the outside blocking layer 126 and scattered light 154 propagating generally perpendicular to and towards the inside (+z direction) propagates through the inside transparent layer 112. Accordingly, it should be understood that scattered light 154 propagating through a plurality of inside view LC pixels 120 can provide an image to an individual viewing the dual side view LC display 10 in the −z direction. Stated differently, the dual side view LC display 10 with the plurality of inside view LC pixels 120 and the plurality of outside view LC pixels 140 shown in FIGS. 1A and 1B independently provide a first image to the inside of dual side view LC display 10 and a second image, optionally different than the first image, to the outside of the dual side view LC display 10.

Referring to FIG. 2A, a dual side view transparent LC display 12 (also referred to herein as "dual side view LC display 12") according to another form of the present disclosure is shown. The dual side view transparent LC display 12 includes the waveguide 110 with the plurality of inside view LC pixels 120 and the plurality of outside view LC pixels 140. In addition, the dual side view transparent LC display 12 includes a transparent pixel 130 between pairs of the first and outside view LC pixels 120, 140.

Similar to the dual side view LC display 10 discussed above, each of the plurality of inside view LC pixels 120 includes the inside electrode 122, the outside electrode 124, and the outside blocking layer 126, and each of the plurality of outside view LC pixels 140 includes the inside electrode 142, the outside electrode 144, and the inside blocking layer 146. In some variations, the outside blocking layer 126 is disposed between the outside electrode 124 and the outside transparent layer 114 as discussed above with respect to FIG. 1A, and the inside blocking layer 146 is disposed between the inside electrode 122 and the inside transparent layer 112 as discussed above with respect to FIG. 1A. Disposed within each of the plurality of inside view LC pixels 120 and each of the plurality of outside view LC pixels 140 is a liquid crystal unit 111. Also, the inside electrodes 122, 142 and the outside electrodes 124, 144 are configured to apply a voltage to the liquid crystal material in the liquid crystal units 111.

Referring now to FIG. 2B, illustration of the dual side view LC display 10 in operation with light propagating from a selected or desired inside view LC pixel 120 and through the inside transparent layer 112 and light propagating from a selected or desired outside view LC pixel 140 and through the outside transparent layer 114 is shown. The dual side view LC display 12 includes the driver circuit 170 configured to provide an electrical control independently to each of the plurality of inside view LC pixels 120, each of the plurality of outside view LC pixels 140, and the light source 150. That is, the driver circuit 170 is configured to provide an electrical control independently to the inside electrode 122 and the outside electrode 124 of each of the inside view LC pixels 120, and to the inside electrode 142 and the outside electrode 144 of each of the outside view LC pixels 140. In addition, the driver circuit 170 is configured to provide an electrical control to the light source 150 such that a predefined light 152 (i.e., a predefined range of EMR wavelengths such as "green light") propagates from the light source 150 and within the waveguide 110. It should be understood that the predefined light 152 is reflected from an outer surface (+z direction) of the inside transparent layer 112, an outer surface (−z direction) of the outside transparent layer 114 and propagates through a liquid crystal unit 111 in the off-state. However, and as illustrated in FIG. 2B, when the predefined light 152 propagates into a liquid crystal unit 111 in the on-state, the predefined light 152 is scattered into scattered light 154 that propagates in a plurality of directions within the liquid crystal unit 111 in the on-state.

For example, and with reference to the liquid crystal unit 111 for the outside view LC pixel 140 closest to the light source 150 in FIG. 2B, the scattered light 154 propagating towards the inside (+z direction) is absorbed or blocked by the inside blocking layer 146 and the scattered light 154 propagating generally perpendicular to and towards the outside (−z direction) propagates through the outside transparent layer 114. Accordingly, it should be understood that scattered light 154 propagating through a plurality of outside view LC pixels 140 can provide an image to an individual viewing the dual side view LC display 12 in the +z direction.

In addition, and with reference to the liquid crystal unit 111 for the second inside view LC pixel 120 from the light source 150 (+y direction) in FIG. 1B, the scattered light 154 propagating towards the outside (−z direction) is absorbed or blocked by the outside blocking layer 126 and the scattered light 154 propagating generally perpendicular to and towards the inside (+z direction) propagates through the inside transparent layer 112. Accordingly, it should be understood that scattered light 154 propagating through a plurality of inside view LC pixels 120 can provide an image to an individual viewing the dual side view LC display 12 in the −z direction. Stated differently, the dual side view LC display 12 with the plurality of inside view LC pixels 120 and the plurality of outside view LC pixels 140 shown in FIGS. 2A and 2B independently provides a first image to the inside of dual side view LC display 12 and a second image, optionally different that the first image, to the outside of the dual side view LC display 12.

Referring to FIG. 3A, a dual side view transparent LC display 14 (also referred to herein as "dual side view LC display 14") according to still another form of the present disclosure is shown. The dual side view transparent LC display 14 includes the waveguide 110 with the plurality of inside view LC pixels 120 and the plurality of outside view LC pixels 140. In addition, the dual side view transparent LC display 12 includes a transparent pixel 132 between the inside view LC pixels 120 and the outside view LC pixel 140. Each of the plurality of inside view LC pixels 120 includes the outside electrode 124 and the outside blocking layer 126, and each of the plurality of outside view LC pixels 140 includes the outside electrode 144, and the inside blocking layer 146. However, and in contrast to the dual side view LC displays 10, 12 discussed above, the dual side view transparent LC display 14 includes a common electrode 123 with FIG. 3C illustrating one non-limiting example of an assembly of the common electrode 123, outside electrode 124, and outside electrode 144. It should be understood that the dual side view LC displays 10, 12 can also use a common electrode as shown and discussed with respect to dual side view LC display 14.

In some variations, the outside blocking layer 126 is disposed between the outside electrode 124 and the outside transparent layer 114, and the inside blocking layer 146 is disposed between the common electrode 123 and the inside transparent layer 112 as discussed above with respect to FIG. 1A. Disposed within each of the plurality of inside view LC pixels 120 and each of the plurality of outside view LC pixels 140 is a liquid crystal unit 111. Also, the common electrode 123 and the outside electrodes 124, 144 are configured to apply a voltage to the liquid crystal material in the liquid crystal units 111.

Referring now to FIG. 3B, illustration of the dual side view transparent LC display 14 in operation and with light propagating through the inside transparent layer 112 and the outside transparent layer 114 is shown. The dual side view transparent LC display 14 includes the driver circuit 170 configured to provide an electrical control independently to one or more of the plurality of inside view LC pixels 120, one or more of the plurality of outside view LC pixels 140, and the light source 150. That is, the driver circuit 170 is configured to provide an electrical control independently to the common electrode 123 and the outside electrode 124 of each of the inside view LC pixels 120 and to the common electrode 123 and the outside electrode 144 of each of the outside view LC pixels 140. In addition, the driver circuit is configured to provide an electrical control to the light source 150 such that a predefined light 152 (i.e., a predefined range of EMR wavelengths such as "green light") propagates from the light source 150 and within the waveguide 110. It should be understood that the predefined light 152 is reflected from an outer surface (+z direction) of the inside transparent layer 112, an outer surface (−z direction) of the outside transparent layer 114 and propagates through a liquid crystal unit 111 in the off-state. However, and as illustrated in FIG. 3B, when the predefined light 152 propagates into a liquid crystal unit 111 in the on-state, the predefined light 152 is scattered into scattered light 154 that propagates in a plurality of directions within the liquid crystal unit 111 in the on-state.

For example, and with reference to the liquid crystal unit 111 for the outside view LC pixel 140 closest to the light source 150 in FIG. 3B, the scattered light 154 propagating towards the inside (+z direction) is absorbed or blocked by the inside blocking layer 146 and the scattered light 154 propagating generally perpendicular to and towards the outside (−z direction) propagates through the outside transparent layer 114. Accordingly, it should be understood that scattered light 154 propagating through a plurality of outside view LC pixels 140 can provide an image to an individual viewing the dual side view transparent LC display 14 in the +z direction.

In addition, and with reference to the liquid crystal unit 111 for the second inside view LC pixel 120 from the light source 150 (+y direction) in FIG. 3B, the scattered light 154 propagating towards the outside (−z direction) is absorbed or blocked by the outside blocking layer 126 and the scattered light 154 propagating generally perpendicular to and towards the inside (+z direction) propagates through the inside transparent layer 112. Accordingly, it should be understood that scattered light 154 propagating through a plurality of inside view LC pixels 120 can provide an image to an individual viewing the dual side view transparent LC display 14 in the −z direction. Stated differently, the dual side view transparent LC display 14 with the plurality of inside view LC pixels 120 and the plurality of outside view LC pixels 140 shown in FIGS. 3A and 3B independently provides a first image to the inside of dual side view transparent LC display 14 and a second image, optionally different that the first image, to the outside of the dual side view LC display 14.

Referring to FIGS. 4A-4C, non-limiting examples of inside view LC pixels 120 are shown. Particularly, FIG. 4A illustrates an inside view LC pixel 120A with the outside blocking layer 126 in the form of a black absorbing layer 126a, FIG. 4B illustrates an inside view LC pixel 120B with the outside blocking layer 126 in the form of a reflecting layer 126r, and FIG. 4C illustrates an inside view LC pixel 120C with the outside blocking layer 126 in the form of a combination of the black absorbing layer 126a and the reflecting layer 126r. It should be understood that the reflecting layer 126r reflects scattered light 154 back towards the inside. That is, in some variations the blocking layer(s) 126 discussed above with respect to FIGS. 1A-3B can be in the form of the reflecting layer(s) 126r and the "blocking layer(s)" reflect scattered light 154 such that scattered light 154 is prevented (blocked) from propagating through the outside transparent layer 114 and is reflected back towards the inside transparent layer 112. It should also be understood that the outside view LC pixels 140 can include blocking layers in the form of a black absorbing layer, a reflecting layer, or a combination of a black absorbing layer and a reflecting layer as described above with respect to the inside view LC pixels 120A, 120B, 120C.

Referring now to FIGS. 5A-5D, photographs of a LC display cell demonstrating operation of a dual side LC display according to the teachings of the present disclosure are shown. The LC display cell was manufactured using a liquid crystal material of 95.9 wt. % nematic liquid crystal BOE5 (from BOE Technology Group Co., Ltd), 3.9 wt. % reactive monomer RM257 (from Merck) and 0.2 wt. % photo-initiator Benzoin methyl ether (from Polyscience Inc.). The LC display cell was assembled with two parallel glass substrates with an indium-tin-oxide (ITO) transparent electrode on each of the glass substrates. Also, the form or shape of the three letters "L C I" was etched by photolithograph into the ITO transparent electrode on one of the glass substrates such that the ITO transparent electrode was not present at these areas or locations. An alignment material PI2117 (from Nissan Chemical) was spin coated on the top of the transparent electrode on both of the glass substrates, and then baked and rubbed to produce a homogeneous alignment for the liquid crystal material. The LC display cell thickness was controlled by 2 micron spacers and the liquid crystal material was infiltrated between the glass substrates to form the display cell. The LC display cell was then irradiated by UV light with an intensity of 6 mW/cm 2 to polymerize the monomer. A black blocking layer was painted on an outer surface of one of the substrates on an inside of the display in order to cover the area of the letters "L" and "I", and another black blocking layer was painted on an outer surface of the other substrate on an outside of the display to cover the area of the letter "C". Also, a white LED was installed on one of the edge of the display.

Figure 5A:
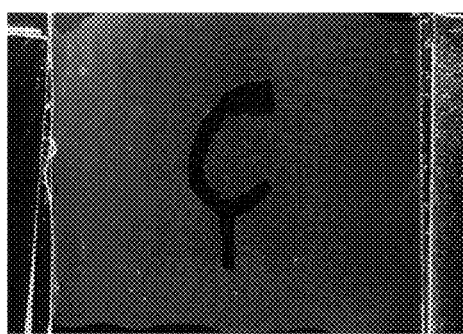
FIG. 5A shows a photograph of a first side of a LC display cell with no voltage applied to the display cell.
Figure 5C:
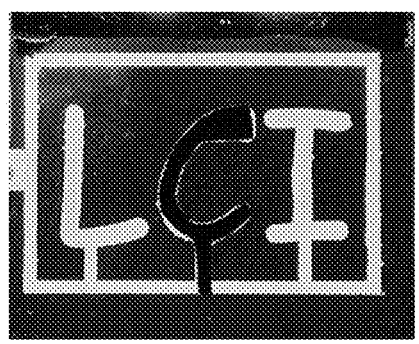
FIG. 5C shows a photograph of the first side of the LC display cell in FIG. 5A with voltage applied to the display cell.
Figure 5B:
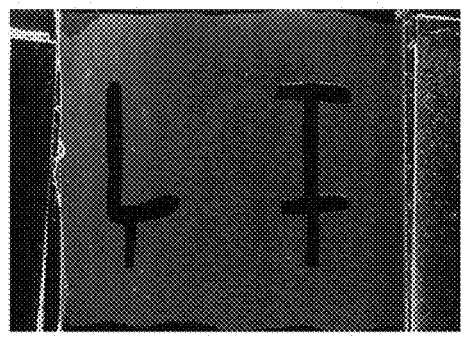
FIG. 5B shows a photograph of a second side of the LC display cell in FIG. 5A with no voltage applied to the display cell.
Figure 5D:
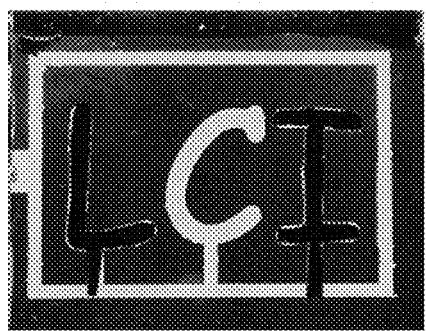
FIG. 5D shows a photograph of the second side of the LC display cell in FIG. 5B with voltage applied to the display cell.

FIG. 5A is a photograph of an inside of the display cell with the black absorbing layer in the shape of the "C", the white LED energized, and no voltage applied across the ITO transparent electrodes, and FIG. 5B is a photograph of the outside of the display cell with the blocking layer in the shape of "L" and "I", the white LED energized, and no voltage applied across the ITO transparent electrodes. Also, FIG. 5C is a photograph of the inside of the display panel and FIG. 5D is a photograph of the outside of the display panel with 15 volts (v) applied across the ITO transparent electrodes. As observed from FIG. 5C, the blocking layer in the form of "C" on the inside of the display blocks light from escaping at the "C" location while light at the "L" and "I" locations propagates through the inside glass substrate. Similarly, the blocking layer in the form of "L" and "I" on the outside of the display blocks light from escaping at the "L" and "I" locations while light at the "C" location propagates through the outside of the display cell as shown in FIG. 5D. Accordingly, FIGS. 5A-5D illustrate using blocking layers in a dual side LC display such that a first image is provided on an inside of the dual side LC display and a second image different than the first image is provided on an outside of dual side LC display.

Figure 6:
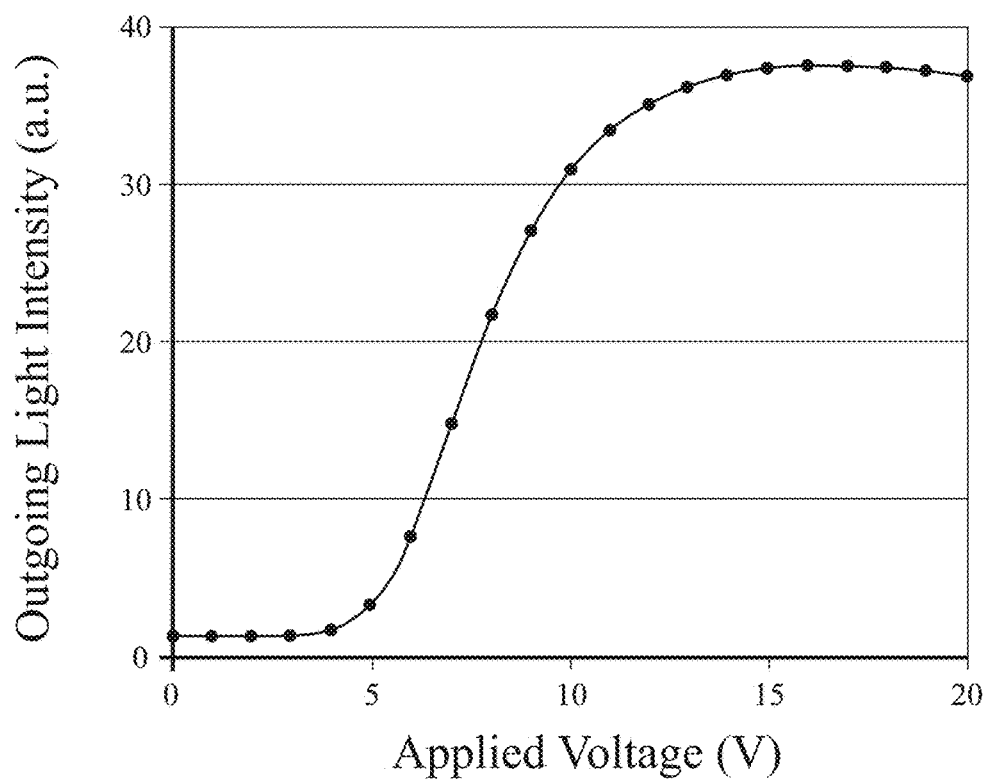
FIG. 6 is a plot of output light intensity as a function of voltage applied to the display cell in FIGS. 5A-5D.

Referring to FIG. 6, a plot of outgoing light intensity as a function of voltage applied across the ITO transparent electrodes of the display cell in FIGS. 5A-5C is shown. And as observed from FIG. 6, with an applied voltage between 0 V to about 3 V the outgoing light intensity was about 2 a.u., and the outgoing light intensity increased up to about 38 a.u. with an increase in applied voltage from about 4V until to about 15 V.

Figure 7A:
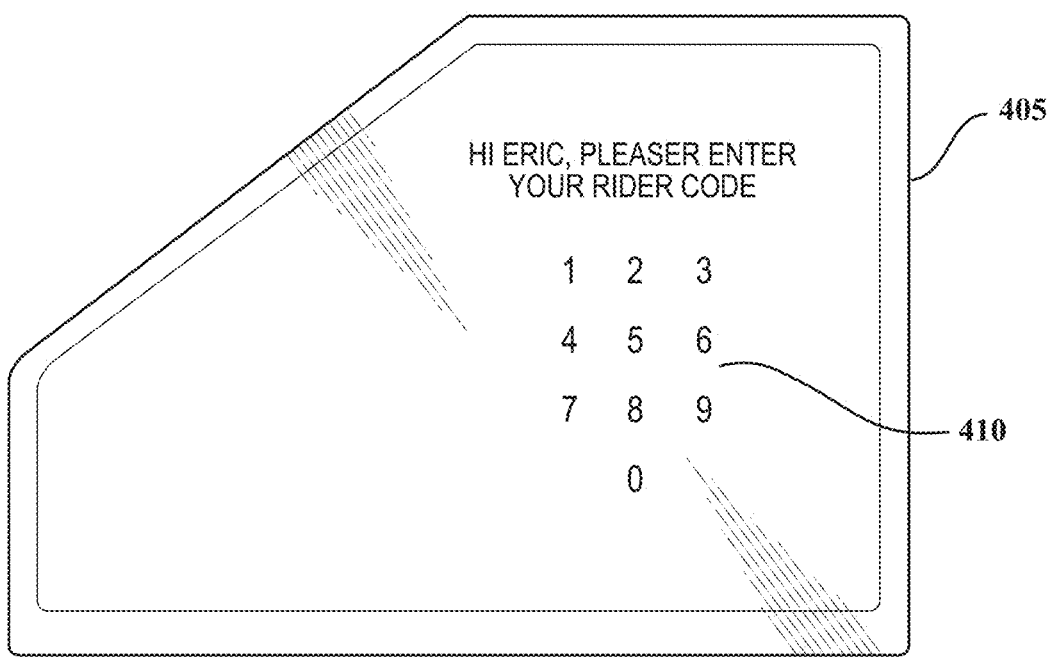
FIG. 7A shows an outside view of a vehicle window with a dual side view LC display according to the teachings of the present disclosure.
Figure 7B:
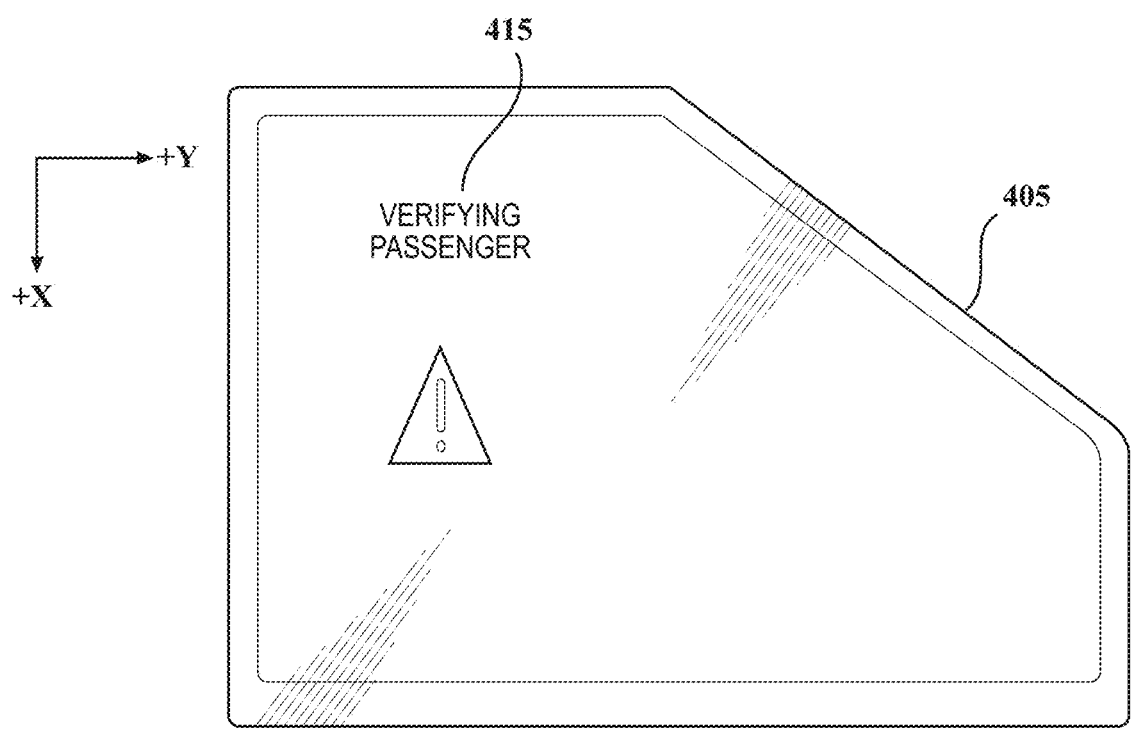
FIG. 7B shows an inside view of the vehicle window in FIG. 7A according to the teachings of the present disclosure.

Referring now to FIGS. 7A-7B, an exterior side of a vehicle smart window 405 that includes a dual-sided transparent LC display according to the teachings of the present disclosure is shown. Particularly, FIG. 7A illustrates the vehicle smart window 405 prompting a user (e.g., a car-sharing customer), via a displayed outside image 410, to enter a rider code to gain entry to the vehicle (not shown). And at the same time the vehicle smart window 405 displays a completely different image 415 to one or more occupants inside the vehicle as illustrated in FIG. 7B. It should be understood that the vehicle smart window 405, as depicted in FIGS. 7A and 7B, is merely one example of a variety of applications for a dual-sided transparent display panel. Other applications include, without limitation, a smart store window (e.g., to display advertising outside the store, direct customers inside the store to products of interest, etc.), informational kiosks at airports and bus stations, education, and gaming/entertainment.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple variations or forms having stated features is not intended to exclude other variations or forms having additional features, or other variations or forms incorporating different combinations of the stated features.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations means that a particular feature, structure, or characteristic described in connection with a form or variation or particular system is included in at least one variation or form. The appearances of the phrase "in one variation" (or variations thereof) are not necessarily referring to the same variation or form. It should be also understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. An edge-lit dual side view display comprising:
   a waveguide comprising an inside transparent layer and an outside transparent layer spaced apart from and parallel to the inside transparent layer;
   a light source attached to an edge of the waveguide and coupled into the edge-lit dual side view display;
   a plurality of inside view liquid crystal (LC) pixels disposed within the waveguide, the plurality of inside view LC pixels comprising a plurality of outside blocking layers configured to block light scattered in the plurality of inside view LC pixels from propagating through the outside transparent layer; and
   a plurality of outside view LC pixels disposed within the waveguide parallel to and in-plane with the plurality of inside view LC pixels, the plurality of outside view LC pixels comprising an inside electrode, and a plurality of inside blocking layers sandwiched between and in direct contact with the inside electrode and the inside transparent layer.

2. The edge-lit dual side view display according to claim 1, wherein one or more of the plurality of inside view LC pixels further comprise an inside electrode proximal to the inside transparent layer, an outside electrode proximal to the outside transparent layer, and a LC material sandwiched between the inside electrode and the outside electrode.

3. The edge-lit dual side view display according to claim 2, wherein the plurality of outside blocking layers is sandwiched between and in direct contact with the outside electrode and the outside transparent layer of the plurality of inside view LC pixels.

4. The edge-lit dual side view display according to claim 1, wherein one or more of the plurality of outside view LC pixels comprise the inside electrode proximal to the inside transparent layer, an outside electrode proximal to the outside transparent layer, and a LC material sandwiched between the inside electrode and the outside electrode.

5. The edge-lit dual side view display according to claim 1, further comprising a plurality of transparent pixels disposed between the plurality of inside view LC pixels and the plurality of outside view LC pixels.

6. The edge-lit dual side view display according to claim 5, wherein each of the plurality of transparent pixels is sandwiched between an inside view LC pixel of the plurality of inside view LC pixels and an outside view LC pixel of the plurality of outside view LC pixels.

7. The edge-lit dual side view display according to claim 1, further comprising a common electrode sandwiched between the inside transparent layer and a LC material of the plurality of inside view LC pixels, and between the inside transparent layer and a LC material of the plurality of outside view LC pixels.

8. The edge-lit dual side view display according to claim 7, wherein the plurality of inside view LC pixels further comprise an outside electrode sandwiched between the outside transparent layer and the LC material of the plurality of inside view LC pixels, and the plurality of outside view LC pixels further comprise an outside electrode sandwiched between the outside transparent layer and the LC material of the plurality of outside view LC pixels.

9. The edge-lit dual side view display according to claim 1, wherein the plurality of inside blocking layers comprises a plurality of black absorbing layers.

10. The edge-lit dual side view display according to claim 1, wherein the plurality of inside blocking layers comprises a plurality of reflecting layers.

11. The edge-lit dual side view display according to claim 1, wherein the plurality of inside blocking layers comprises a plurality black absorbing layers and a plurality of reflecting layers.

12. The edge-lit dual side view display according to claim 1, wherein the plurality of outside blocking layers comprises a plurality of black absorbing layers.

13. The edge-lit dual side view display according to claim 1, wherein the plurality of outside blocking layers comprises a plurality of reflecting layers.

14. An edge-lit dual side view display comprising:
    a waveguide comprising an inside transparent layer and an outside transparent layer spaced apart from and parallel to the inside transparent layer;
    a light source attached to an edge of the waveguide and coupled into the edge-lit dual side view display;

a plurality of inside view liquid crystal (LC) pixels disposed within the waveguide and comprising a plurality of outside blocking layers configured to block light scattered in the plurality of inside view LC pixels from propagating through the outside transparent layer, the plurality of outside blocking layers selected from the group consisting of a plurality of black absorbing layers and a plurality of reflecting layers; and a plurality of outside view LC pixels disposed within the waveguide parallel to and in-plane with the plurality of inside view LC pixels, the plurality of outside view LC pixels comprising an inside electrode, and a plurality of inside blocking layers sandwiched between and in direct contact with the inside electrode and the inside transparent layer and configured to block light scattered in the plurality of outside view LC pixels from propagating through the inside transparent layer.

15. The edge-lit dual side view display according to claim 14, wherein each of the plurality of inside view LC pixels comprise an inside electrode proximal to the inside transparent layer, an outside electrode proximal to the outside transparent layer, a LC material sandwiched between the inside electrode and the outside electrode, and the plurality of outside blocking layers is sandwiched between the outside electrode and the outside transparent layer of the plurality of inside view LC pixels.

16. The edge-lit dual side view display according to claim 14, wherein each of the plurality of outside view LC pixels comprise the inside electrode proximal to the inside transparent layer, an outside electrode proximal to the outside transparent layer, and a LC material sandwiched between the inside electrode and the outside electrode.

17. An edge-lit dual side view display comprising:
a waveguide comprising an inside transparent layer and an outside transparent layer spaced apart from and parallel to the inside transparent layer;
a light source attached to an edge of the waveguide and coupled into the edge-lit dual side view display;
a plurality of inside view liquid crystal (LC) pixels disposed within the waveguide and comprising an inside electrode proximal to the inside transparent layer, an outside electrode proximal to the outside transparent layer, a LC material sandwiched between the inside electrode and the outside electrode, and a plurality of outside blocking layers configured to block light scattered in the plurality of inside view LC pixels from propagating through the outside transparent layer, the plurality of outside blocking layers sandwiched between and in direct contact with the outside electrode and the outside transparent layer of the plurality of inside view LC pixels; and a plurality of outside view LC pixels disposed within the waveguide parallel to and in-plane with the plurality of inside view LC pixels, the plurality of outside view LC pixels comprising an inside electrode proximal to the inside transparent layer, an outside electrode proximal to the outside transparent layer, a LC material sandwiched between the inside electrode and the outside electrode, and a plurality of inside blocking layers configured to block light scattered in the plurality of outside view LC pixels from propagating through the inside transparent layer, the LC material of the plurality of inside view LC pixels and the LC material of the plurality of outside view LC pixels being a polymer stabilized LC material controlled to scatter light by voltage.

18. The edge-lit dual side view display according to claim 17, wherein the plurality of outside blocking layers is sandwiched between the outside electrode and the outside transparent layer of the plurality of inside view LC pixels, and the plurality of inside blocking layers is sandwiched between the inside electrode and the inside transparent layer of the plurality of outside view LC pixels.

19. The edge-lit dual side view display according to claim 17, wherein the plurality of outside blocking layers comprises a plurality of black absorbing layers.

20. The edge-lit dual side view display according to claim 17, wherein the plurality of outside blocking layers comprises a plurality of reflecting layers.

\* \* \* \* \*

UNITED STATES PATENT AND TRADEMARK OFFICE
CERTIFICATE OF CORRECTION

| | | |
|---|---|---|
| PATENT NO. | : 11,906,832 B1 | Page 1 of 1 |
| APPLICATION NO. | : 17/875779 | |
| DATED | : February 20, 2024 | |
| INVENTOR(S) | : Deng-Ke Yang et al. | |

It is certified that error appears in the above-identified patent and that said Letters Patent is hereby corrected as shown below:

On the Title Page

In item (73),
Remove "MIRISE Technology Corporation, Beijing (CN)".
Add "BOE Technology Group Co. LTD., Beijing (CN)".

Signed and Sealed this
Sixth Day of January, 2026

John A. Squires
*Director of the United States Patent and Trademark Office*